United States Patent [19]

Schaap

[11] Patent Number: 4,834,601
[45] Date of Patent: May 30, 1989

[54] WALL FASTENER

[76] Inventor: Klaas Schaap, 6441 Stonehaven, Dallas, Tex. 75240

[21] Appl. No.: 56,066

[22] Filed: Jun. 1, 1987

[51] Int. Cl.[4] ............................................. F16B 21/00
[52] U.S. Cl. .................................... 411/340; 411/908; 411/913
[58] Field of Search ................ 411/340, 344, 508–510, 411/908, 913, 49–51, 73, 38

[56] References Cited

U.S. PATENT DOCUMENTS

| | | | |
|---|---|---|---|
| 750,536 | 1/1904 | Haggerty | 411/51 |
| 1,049,376 | 1/1913 | Le Manquais | 411/913 X |
| 2,805,597 | 9/1957 | O'Shaughnessy, Jr. | 411/60 |
| 3,139,768 | 7/1964 | Biesecker | 411/508 X |
| 3,288,014 | 11/1966 | Mortensen | 411/344 |
| 3,403,594 | 10/1968 | Newell | 411/344 |
| 3,513,746 | 5/1970 | Forsberg | 411/346 |
| 3,728,761 | 4/1973 | Holly | 411/908 X |
| 3,888,156 | 6/1975 | Fima | 411/38 |
| 4,274,324 | 6/1981 | Giannuzzi | 411/38 |
| 4,416,048 | 11/1983 | Otte | 411/50 X |

FOREIGN PATENT DOCUMENTS 2001148  1/1979  United Kingdom .................. 411/60

Primary Examiner—Lloyd A. Gall
Assistant Examiner—Curtis B. Brueske
Attorney, Agent, or Firm—W. Kirk McCord

[57]     ABSTRACT

A wall fastener comprising a hollow conical member, a cylindrical sleeve member disposed substantially within the conical member, an anchoring member attached to the sleeve member for engaging the inner surface of a hollow wall and a rotatable threaded member extending through aligned openings in the conical member, sleeve member and anchoring member for tightly securing the fastener to the wall. The anchoring member is comprised of a central housing and a plurality of resilient curved feet flared outwardly from the housing. The feet are bendable toward the axis of the threaded member to allow the anchoring member to be inserted through a hole in the wall. When the anchoring member has cleaned the hole, the feet are spring-biased to return to the outwardly flared position to engage the inner surface of the wall. As the threaded member is tightened, the feet are compressed against the inner surface of the wall, which causes the feet to flatten and expand outwardly to engage the inner surface of the wall at a greater distance from the hole, thereby providing a more secure attachment of the fastener to the wall. The conical member, sleeve member and anchoring member are fixed against rotation with respect to the threaded member to prevent the fastener from damaging the wall in the event that the threaded member is over-torqued.

23 Claims, 5 Drawing Sheets

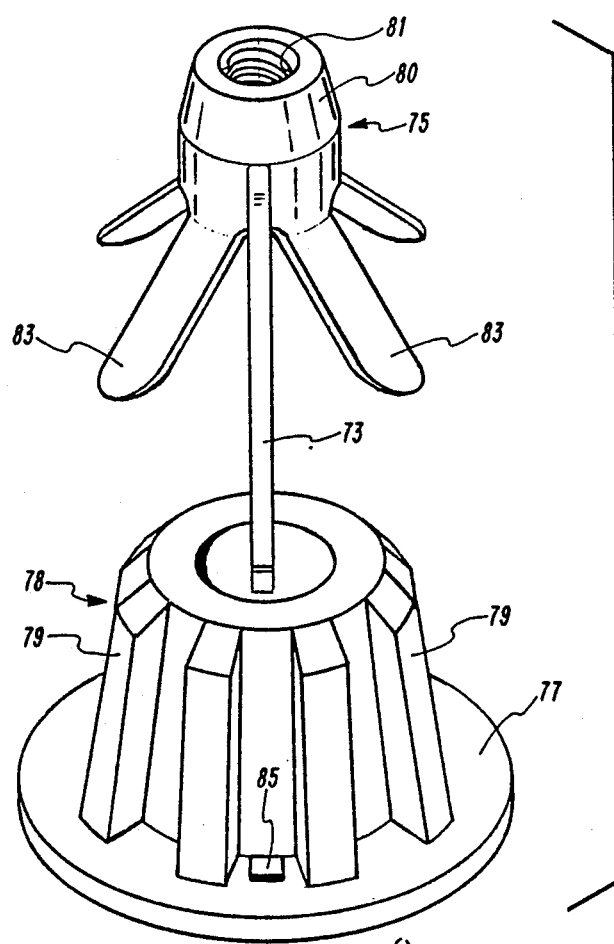
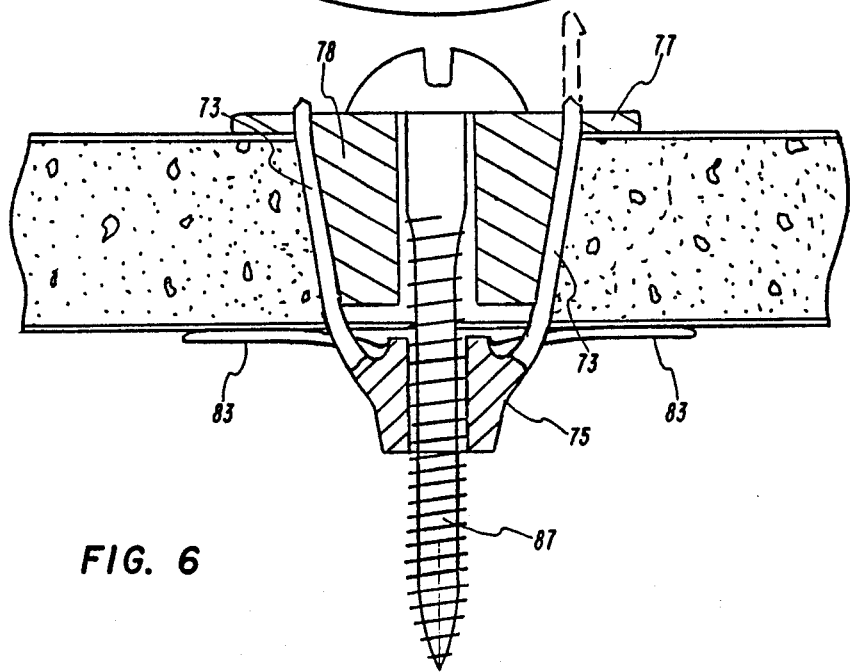
FIG. 5
FIG. 6

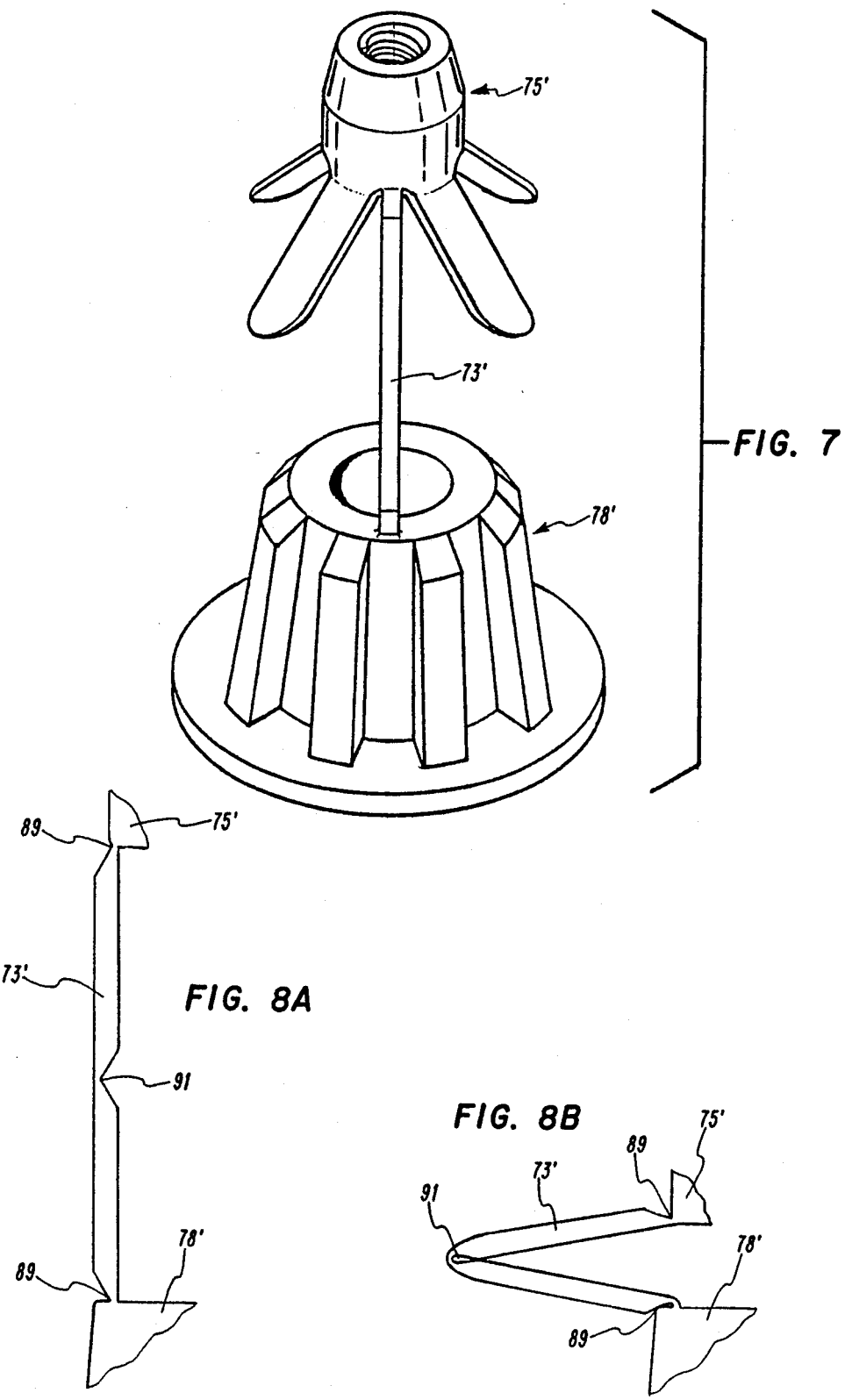

WALL FASTENER

FIELD OF THE INVENTION

The present invention relates generally to wall fasteners and in particular to a fastener used in connection with hollow walls made of lightweight material, such as gypsum board or the like.

BACKGROUND OF THE INVENTION

Wall fasteners are typically installed in hollow walls made of lightweight material, such as gypsum board, to attach objects to the wall. Such fasteners are useful in supporting relative heavy objects, such as framed pictures, which are attached to the wall.

DESCRIPTION OF THE PRIOR ART

According to prior practice, fasteners installed in hollow walls are comprised of a threaded member, such as a bolt or screw, and an anchoring mechanism. Rotation of the threaded member causes the anchoring mechanism to expand and contact the inside of the wall to anchor the fastener in place. Common examples of such fasteners are the so-called "toggle" bolts and "moly" bolts. Various types of fasteners are described in the following U.S. Pat. Nos.: 4,136,599; 4,086,840; 4,077,300; 3,905,570; 3,874,264; 3,869,958; 3,752,032; 3,701,302; 3,605,846; 3,555,960; 3,534,797; 3,487,746; 3,366,405; 3,315,558; 3,211,044; 3,136,350; 3,104,582; and 1,978,935.

One problem associated with such prior art fasteners is that a portion of the anchoring mechanism is usually received within the hole in the wall through which the fastener is inserted. Therefore, stress exerted by heavy objects attached to the fastener on the outside of the wall may cause the fastener to pull outwardly through the opening. Another problem is that such fasteners must be carefully installed to insure that they are overtorqued. Continued twisting of the threaded bolt or screw after the anchoring mechanism has contacted the inner surface of the wall will cause the anchoring mechanism to twist and dig into the inner surface of the wall. This digging action scours out the wall hole, which increases the size of the hole and causes the fastener to fit loosely within the wall, thereby increasing the likelihood that the fastener will become dislodged from the wall.

OBJECTS OF THE INVENTION

It is therefore the principal object of the present invention to provide an improved wall fastener.

It is another object of the invention to provide an improved fastener for use in connection with hollow walls made of lightweight material, such as gypsum board.

It is yet another object of the invention to provide a fastener which can be securely anchored within a hole formed in a hollow wall.

It is a further object of the invention to provide a fastener which allows relatively heavy objects to be attached to a hollow wall, wherein the stresses exerted by such objects are distributed over a relatively wide area around the wall hole in which the fastener is anchored.

It is still a further object of the invention to provide a fastener having a rotatable threaded member and an anchoring member in which the twisting action of the threaded member does not rotate the anchoring member.

SUMMARY OF THE INVENTION

These and other objects are accomplished in accordance with the present invention wherein a fastener adapted for insertion within a hole extending through a wall is provided. The fastener is comprised of a conical member tapering downward from a first end to a second end thereof and having an opening extending axially therethrough; an anchoring member disposed adjacent to the second end of the conical member; means for attaching the anchoring member to the conical member so that the anchoring member is fixed against rotation with respect to the conical member; and a threaded member extending through respective aligned openings in the conical member and anchoring member and being in engagement with complementary threads within the opening in the anchoring member. The conical member and anchoring member are fixed against rotation so that the threaded member is freely rotatable with respect to the conical member, sleeve member and anchoring member.

In one aspect of the invention the anchoring member is comprised of a central housing and a plurality of resilient feet curved outwardly from the central housing for engaging an inner surface of the wall to anchor the fastener to the wall. The feet are bendable in the direction of the threaded member to allow the anchoring member to be inserted through the wall hole and are spring-biased to expand outwardly from the threaded member to engage the inner surface of the wall when the anchoring member clears the hole on the inside of the wall.

In another aspect of the invention the feet are compressible against the inner surface of the wall in response to the rotation of the threaded member in a predetermined direction, so that the feet tend to flatten and engage the inner surface of the wall at a greater distance outward from the perimeter of the hole in response to an increased compressive force resulting from the continued rotation of the threaded member in the predetermined direction.

In the preferred embodiment the fastener includes a sleeve member threaded on an inner surface thereof and disposed substantially within the opening in the conical member. The conical member, sleeve member and anchoring member are comprised of a lightweight plastic material. The conical member preferably includes first and second opposite tab members adjacent to the second end thereof, which extend radially into the opening in the conical member. The sleeve member has first and second opposite grooves on an outer surface thereof for mating with the first and second tab members to fix the sleeve member against rotation with respect to the conical member. The sleeve member further includes a retaining member for engaging the first and second tab members within the opening in the conical member to limit the axial movement of the sleeve member with respect to the conical member.

The fastener preferably includes a relatively flat washer member for engaging an outer surface of the wall around the perimeter of the hole. The washer member has a central opening therein for receiving the threaded member. The threaded member is preferably comprised of a screw having a head on one end thereof, which is substantially wider than the diameter of the shaft of the screw. The head is also wider than the diameter of the central opening of the washer member so that the washer member is sandwiched between the outer surface of the wall and the screw head to provide a compression fitting to enhance the locking action imparted to the fastener when the screw is rotated in the predetermined direction. A plurality of rib members are disposed on the outer surface of the conical member for locking the conical member in place within the hole to prevent rotation of the conical member, sleeve member and anchoring member.

BRIEF DESCRIPTION OF THE DRAWINGS

Other objects and advantages of the invention will be apparent from the detailed description and claims when read in conjunction with the accompanying drawings wherein:

FIG. 5 is an isometric view of an alternate embodiment of the wall fastener according to the present invention; and FIG. 6 is a sectional view of the wall fastener shown in FIG. 5, which illustrates the installation of the fastener in a hollow wall;

FIG. 7 is an isometric view of another alternate embodiment of the wall fastener according to the present invention; and FIGS. 8A and 8B are elevation views of the leg members of the wall fastener shown in FIG. 7.

DETAILED DESCRIPTION OF THE PREFERRED EMBODIMENT

In the description which follows, like parts are marked throughout the specification and drawings, respectively. The drawings are not necessarily to scale and in some instances proportions have been exaggerated in order to more clearly depict certain features of the invention.

Figure 1:
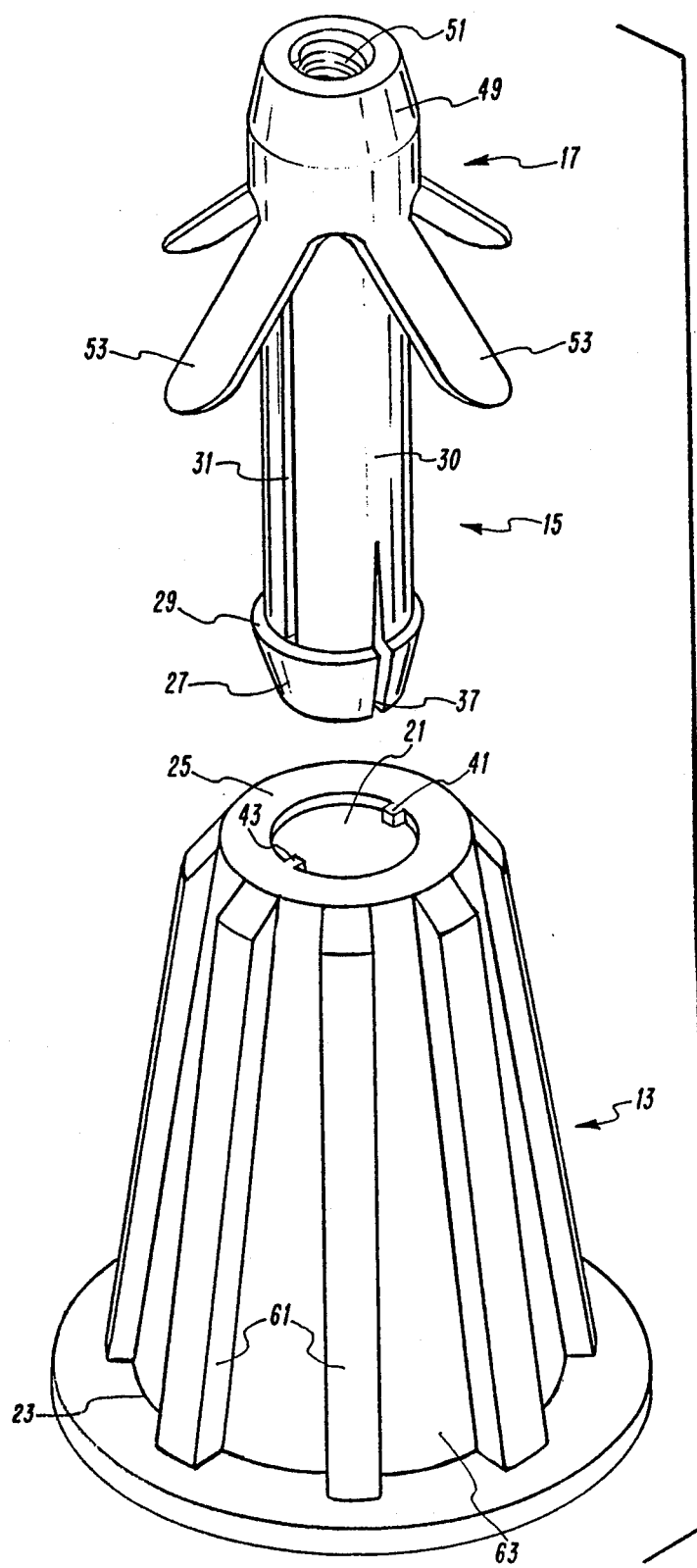
FIG. 1 is an isometric view of selected ones of the major components of the wall fastener according to the present invention.

Referring to FIGS. 1–4, a wall fastener 11 according to the present invention is comprised of a conical member 13, cylindrial sleeve member 15, anchoring member 17 and threaded member 19. In FIG. 1 sleeve member 15 is shown removed from conical member 13. When fastener 11 is assembled, sleeve member 15 is substantially disposed within a cylindrical chamber 21 extending axially between respective openings in first and second ends 23 and 25 of conical member 13. Sleeve member 15 has a tapered base portion 27 at one end thereof and an annular retaining member 29 just above base portion 27. Retaining member 29 is slightly wider than main cylindrical body portion 30 of sleeve member 15. Anchoring member 17 is preferably integrally formed on the opposite end of the sleeve member 15 from base portion 27.

Main cylindrical body portion 30 of sleeve member 15 has a pair of diametrically opposed grooves 31 (only one of which is shown in FIG. 1) extending substantially along the entire length of sleeve member 15 between base portion 27 and anchoring member 17. Sleeve member 15 also has a pair of diametrically opposed slits 37 (only one of which is shown in FIG. 1), which extend through base portion 27, retaining member 29 and partially upwardly along main cylindrical body portion 30 of sleeve member 15. Slits 37 are each disposed at substantially equal angular intervals between grooves 31. Slits 37 cooperate with tapered base portion 27 to allow retaining ring 29 to be compressed sufficiently to reduce the diameter thereof to allow retaining member 29 to fit through the opening in second end 25 of conical member 13 when sleeve member 15 is inserted into cylindrical chamber 21.

Conical member 13 has a pair of diametrically opposed tab members 41 and 43 projecting radially into cylindrical chamber 21, adjacent to second end 25. In order to insert sleeve member 15 into cylindrical chamber 21, base portion 27 and retaining member 29 must be compressed sufficiently to enable retaining member 29 to clear tab members 41 and 43. The spring bias of the material will cause retaining member 29 to expand outwardly and engage the inner walls of cylindrical chamber 21 to provide a friction fit between sleeve member 15 and conical member 13 within chamber 21.

Figure 3:
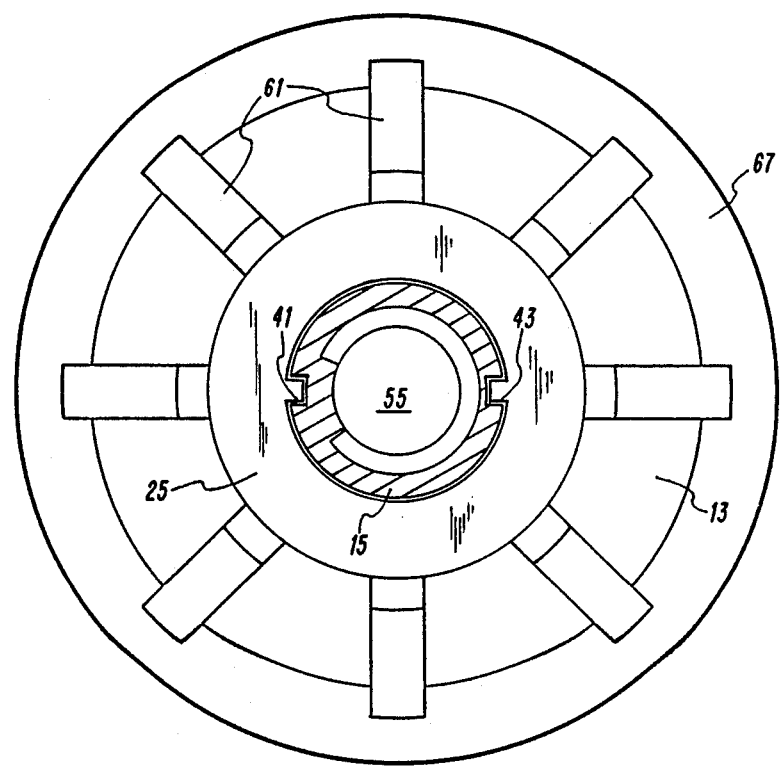
FIG. 3 is a plan view of the conical member and sleeve member components, viewed from above the section line 3—3 in FIG. 2, illustrating the engagement between the sleeve member and conical member.
Figure 4:
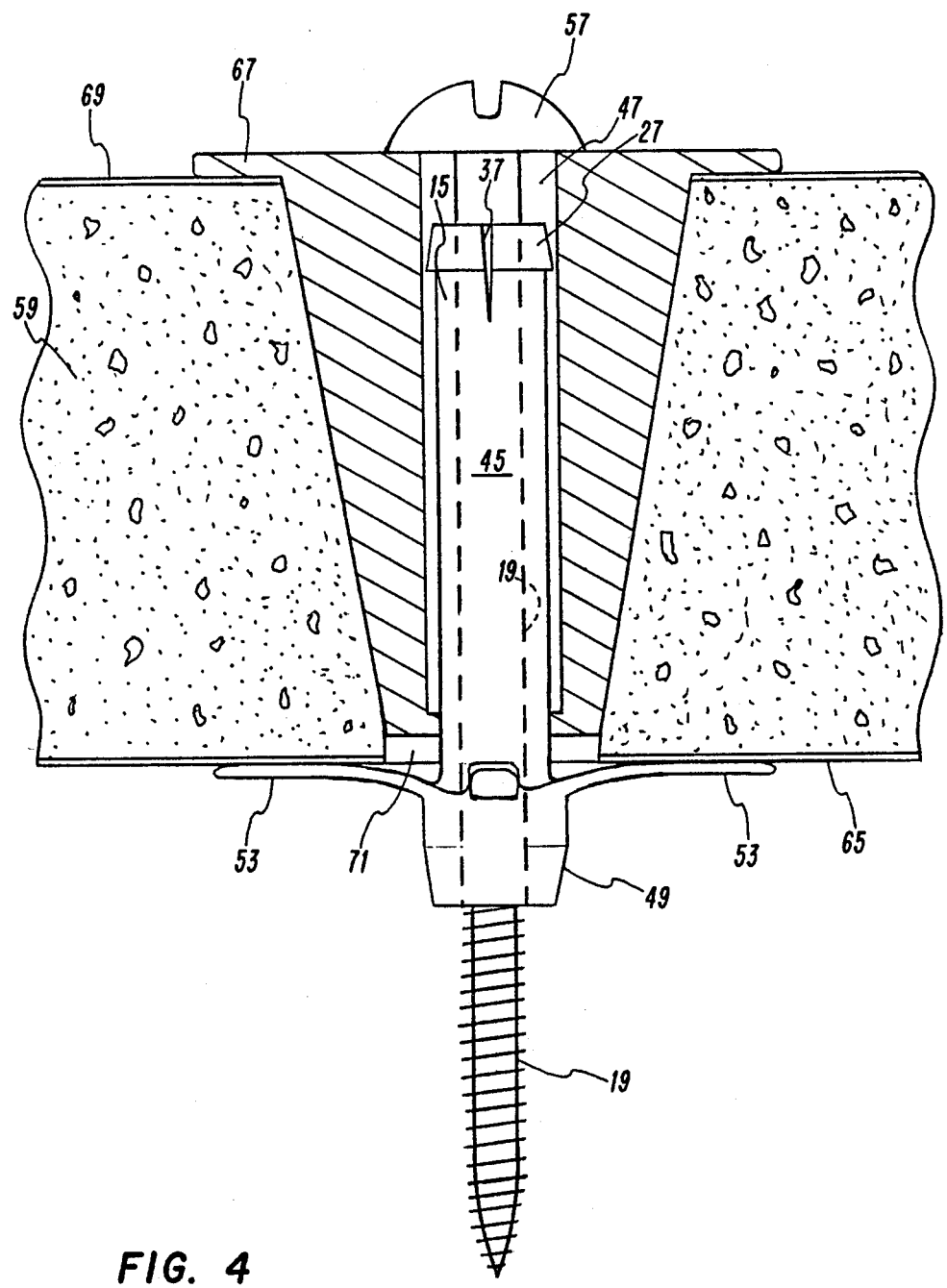
FIG. 4 is a sectional view of the wall fastener according to the present invention, installed in a hollow wall.

An annular spacing 45 is maintained between main body portion 30 and the inner wall of chamber 21 (as best seen in FIG. 4) by virtue of retaining member 29, which extends slightly outward (e.g., on the order of 1/32 inch) from main body portion 30. Sleeve member 15 is of substantially the same length as conical member 13 so that when sleeve member 15 is properly received within chamber 21, a portion of sleeve member 25 adjacent to anchoring member 17 protrudes slightly outward from chamber 21 adjacent to second end 25 and a corresponding spacing 47 is defined between base portion 27 and first end 23 of conical member 13 to allow sleeve member 15 room to move in the direction of first end 23 when fastener 11 is tightened by means of threaded member 19. Sleeve member 15 is oriented with respect to conical member 13, such that tab members 41 and 43 will mate with complementary respective grooves 31, thereby fixing sleeve member 15 against rotation with respect to conical member 13, as best seen in FIG. 3.

Anchoring member 17 is comprised of a housing 49 having a threaded central opening 51 extending therethrough and a plurality of curved feet 53 flared outwardly from housing 49. Feet 53 are sufficiently resilient so as to be bendable in the direction of main body portion 30 to allow anchoring member 17 to be inserted through a wall hole. After anchoring member 17 clears the hole on the inside of the wall, the spring bias of feet 53 will return feet 53 to the outwardly flared position for engaging the inner surface of the wall, as best seen in FIG. 4. Central opening 51 in housing 49 is aligned with the corresponding opening 55 extending axially through sleeve member 15 for receiving threaded member 19.

Figure 2:
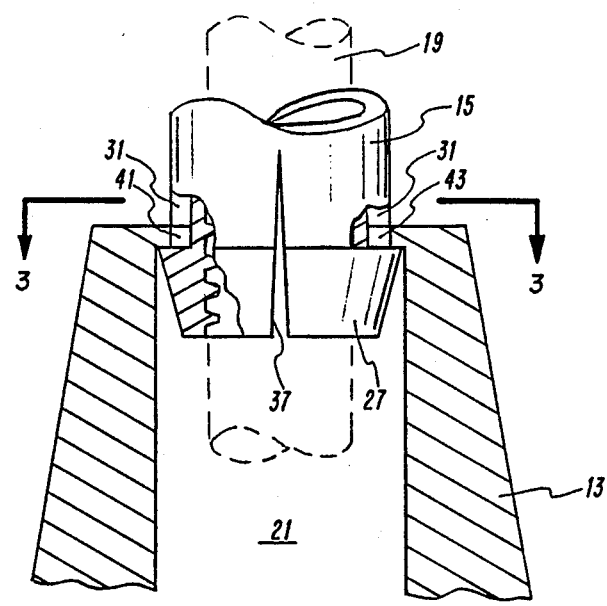
FIG. 2 is a sectional view of respective portions of the conical member and sleeve member components of the wall fastener, illustrating the limitation of the axial movement of the sleeve member with respect to the conical member.

Threaded member 19 is preferably comprised of a threaded screw or bolt having a head 57 on one end thereof which is substantially wider than the diameter of the main shaft portion of threaded member 19. Threaded member 19 is of sufficient length to extend all the way through concial member 13, sleeve member 15 and anchoring member 17. The respective surfaces surrounding the corresponding aligned openings in housing 49 and sleeve member 15 are threaded to engage the complementary threads on threaded member 19, so that the rotation of threaded member 19 will cause sleeve member 15 and anchoring member 17 to move axially with respect to conical member 13. The axial movement of sleeve member 15 and anchoring member 17 is limited in the direction of first end 23 by the engagement of second end 25 with flared feet 53 and in the direction of second end 25 by the engagement of tab members 41 and 43 with retaining member 29, as best shown in FIG. 2. In this manner, sleeve member 15 is prevented from accidentally becoming dislodged from chamber 21.

Referring specifically to FIG. 4, fastener 11 is installed in a hollow wall made of a lightweight material, such as gypsum board or sheetrock, by first boring a hole in wall 59 using a tap tool or the like. Feet 53 are then compressed in the direction of sleeve member 15 to allow anchoring member 17 to be inserted through the hole from the outside of wall 59 to the inside thereof. The hole formed in wall 59 should be sufficiently large to allow anchoring member 17 to be inserted therethrough and conical member 13 to be received therein, but should be small enough to provide a tight friction fit between the portion of wall 59 surrounding the hole and the outer surface of conical member 13.

Referring also to FIG. 1, conical member 13 has a plurality of elongated ribs 61 disposed around the perimeter thereof for enhancing the friction fit between outer surface 63 of conical member 13 and the portion of the wall surrounding the hole. It is important that conical member 13 be securely held within the wall hole to prevent rotation of conical member 13 when a torque is applied to threaded member 19.

One skilled in the art will appreciate that the rotation of threaded member 19 is used to selectively tighten or loosen the attachment of fastener 11 on wall 59. If the conventional right-hand threaded screw is used as threaded member 19, the rotation of threaded member 19 in a clockwise direction, as viewed from outside wall 59, will cause sleeve member 15 and anchoring member 17 to migrate along threaded member 19 in the direction of head 57. This action compresses feet 53 against inner surface 65 of wall 59, thereby causing feet 53 to flatten and expand farther outward from housing 49. This not only tightens the attachment of fastener 11 to wall 59, but also causes feet 53 to engage inner surface 65 at a greater distance from the perimeter of the wall hole. Thus, any stresses exerted on fastener 11 will be distributed by feet 53 over a comparatively wider area of inner surface 65 around the wall hole, thereby enhancing the strength of the attachment and reducing the likelihood that the sheetrock wall will be broken or damaged due to excessive stresses caused by the weight of an object hanging on fastener 11 on the outside of wall 59.

Disposed between first end 23 of conical member 13 and head 57 of threaded member 19 is a relatively flat washer member 67. Washer member 67 is preferably integrally formed on first end 23. Washer member 67 has a central opening disposed in alignment with and having substantially the same diameter as cylindrical chamber 21 for receiving the shaft of threaded member 19. The diameter of the central opening is sufficiently small to prevent head 57 from penetrating into the central opening. As a result, washer member 67 is sandwiched between head 57 and outer surface 69 of wall 59 to provide a compression fitting as torque is applied to threaded member 19. Washer member 67 cooperates with anchoring member 17 to hold fastener 11 securely in position on wall 59 and to distribute stresses exerted on fastener member 11 over a relatively wide area surrounding the hole.

When fastener member 11 is properly installed in wall 59, conical member 13 is disposed completely within the hole such that first end 23 is substantially coterminous with outer surface 69 and second end 25 is slightly recessed, as indicated at 71, from inner surface 65 inside wall 59. Thus, the length of concial member 13 is preferably slightly less than the thickness of wall 59. One skilled in the art will recognize that the length of conical member 13 is a function of the thickness of wall 59. Furthermore, multiple layers of sheetrock or gypsum board may be sandwiched together to form wall 59 and secured together by means of a single wall fastener 11, which extends through the multiple layers.

Referring to FIGS. 5 and 6, an alternate embodiment of the wall fastener according to the present invention is depicted. In this embodiment sleeve member 15 is replaced by a pair of legs 73, which are attached at respective first ends thereof to anchoring member 75 and at respective second ends thereof to washer member 77, which is integrally formed on one end of conical member 78. Ribs 79 are disposed on the outer surface of conical member 78 for engaging the inside of the wall surrounding the wall hole to enhance the friction fit between the fastener and the inside of the wall, as described above with reference to FIGS. 1-4, to prevent conical member 78 from being rotated. Legs 73 fix anchoring member 75 against rotation with respect to conical member 78.

Anchoring member 75 is comprised of a housing 80 having a threaded central opening 81 extending therethrough and a plurality of curved feet 83 flared outwardly from housing 80. Feet 83 operate in substantially the same manner as feet 53, described above with reference to FIGS. 1-4. Respective first ends of legs 73 are permanently attached to housing 80 and respective second ends of legs 73 are inserted through respective openings 85 in washer member 77. After the fastener is secured in the wall, the portions of legs 73 which extend through openings 85 may be clipped off. One skilled in the art will recognize that legs 73 may be permanently attached at both ends to housing 80 and washer member 77 or, alternatively, the respective second ends may be permanently attached to washer member 77 and the respective first ends may be removably attached to anchoring member 75, such as by inserting the respective first ends through complementary openings (not shown) in anchoring member 75. A threaded member 87 extends through the aligned openings in conical member 79 and anchoring member 75, as shown in FIG. 6, and engages complementary threads within opening 81.

Referring to FIGS. 7, 8A and 8B, yet another alternate embodiment of the wall fastener is illustrated. This embodiment is substantially the same as the embodiment described above with reference to FIGS. 5 and 6, except that legs 73' are permanently attached at their respective ends to both anchoring member 75' and conical member 78'. As illustrated in FIGS. 8A and 8B, legs 73' are beveled, as indicated at 89, on their outer surfaces adjacent to their respective ends and notched, as indicated at 91, on their inner surfaces at their respective centers to allow legs 73' to collapse and expand outwardly from an extended position (as shown in FIG. 8A) to a folded position (as shown in FIG. 8B) when anchoring member 75' is drawn in the direction of conical member 78' by the rotation of the threaded member extending through the aligned openings in conical member 78' and anchoring member 75'.

The embodiments depicted in FIGS. 5-8 are particularly well-suited for being used in connection with relatively thin materials, such as particle board or thin sheetrock material (i.e., on the order of ¼ inch or less).

The wall fastener according to the present invention solves many of the problems associated with prior art fasteners. All of the components of the fastener are fixed against rotation except for the threaded member, which eliminates the danger of breaking or damaging the sheetrock as a result of over-torquing the threaded member. Furthermore, any axially directed force which tends to pull the fastener out of the wall will compress the feet of the anchoring member, causing them to spread out even more and engage a wider area of the inner surface of the wall around the hole to prevent the fastener from being removed. The major components of the fastener, except for the threaded member, are preferably comprised of a lightweight plastic material, but any suitable material other than plastic may be used to form these components, provided that the feet of the anchoring member are sufficiently resilient and yet rigid enough to provide the capabilities described above.

Various embodiments of the invention have been described in detail. Since it is obvious that many changes in and additions to the above described preferred embodiment may be made without departing from the nature, spirit and scope of the invention, the invention is not to be limited to said details except as set forth in the appended claims.

What is claimed is:

1. A fastener attachable to an article having first and second opposite major surfaces and a fastener receiving opening therebetween, comprising:

anchoring means for being inserted through said opening in a direction from said first major surface to said second major surface, said anchoring means having a central member and a plurality of elongated feet with free ends, said feet being biased outwardly from said central member to define an initial spread foot configuration, said feet being bendable so that the respective free ends of said feet can be moved toward one another to allow said anchoring means to be inserted through said opening;

positioning means coupled to said anchoring means for engaging said article to substantially fix said anchoring means against rotation; and securing means for engaging said anchoring means to move said anchoring means in a direction toward said second major surface after said anchoring means has been inserted through said opening to effect an engagement between said feet and said second major surface, said second major surface for exerting a reaction force on said feet to flatten said feet and spread the free ends of said feet outwardly from said initial spread foot configuration.

2. The fastener according to claim 1 wherein said central member has a substantially cylindrical shape and said feet extend both radially and axially outward therefrom at predetermined intervals around substantially the entire circumference of said central member.

3. The fastener according to claim 1 wherein each of said feet has a relatively flat engagement surface extending substantially the entire length thereof for contacting said second major surface, a greater portion of each engagement surface for contacting the second major surface as the anchoring means is drawn toward the second major surface and the reaction force of second said major surface flattens the feet and spreads the feet outwardly from the initial spread foot configuration, so that substantially the entire engagement surface of each of said feet can contact the second major surface.

4. The fastener according to claim 3 wherein the engagement force between the second major surface and the feet is distributed substantially evenly among the feet and around substantially the entire perimeter of the opening to securely attach the fastener to the article.

5. The fastener according to claim 1 wherein said feet are spring biased to move radially outward from said central member when the anchoring means clears the opening after being inserted therethrough so that said feet engage the second major surface of the article when the anchoring means is drawn toward said second major surface, said feet being bendable so that the respective free ends of said feet can be moved away from one another and folded back toward said central member to allow said anchoring means to be drawn back through said opening when sufficient force is exerted on said fastener acting in a direction from the second major surface to the first major surface.

6. The fastener according to claim 2 wherein said positioning means is comprised of a conical member tapering downward from a first end to a second end thereof and having a central bore extending axially therethrough, said conical member being adapted for insertion within a substantially circular opening in said article, the first end of said conical member having a slightly greater diameter than the diameter of said circular opening and the second end of said conical member having a slightly smaller diameter than the diameter of said circular opening so that at least a portion of said conical member is insertable within said opening and the outer surface of the conical member engages a portion of the article within the opening to provide a relatively tight friction fit between the conical member and the article.

7. The fastener according to claim 6 wherein the outer surface of said conical member has a plurality of elongated ribs disposed thereon for enhancing the friction fit between the conical member and said portion of the article within the opening.

8. The fastener according to claim 6 wherein said positioning means further includes a sleeve member threaded on an inner surface thereof and disposed substantially within the bore in said conical member, said sleeve member being coupled between said conical member and said anchoring means.

9. A method of attaching a fastener to an article having first and second opposite major surfaces and a fastener receiving opening therebetween, said method comprising the steps of:

providing a fastener having anchoring means for being inserted through said opening to engage the second major surface of the article, positioning means coupled to the anchoring means to fix the anchoring means against rotation and an elongated threaded member for engaging complementary threads in the anchoring means to move the anchoring means in a direction toward the second major surface after the anchoring means has been inserted through the opening, said anchoring means having a central member and a plurality of elongated feet with free ends, said feet being biased outwardly from said central member to define an initial spread foot configuration, said feet being bendable so that the respective free ends thereof can be moved toward and away from the major axis of said threaded member;

bending the free ends of said feet toward the major axis of said threaded member and inserting said anchoring means into said opening;

moving the fastener in a direction from said first major surface to said second major surface until said anchoring means clears said opening and said positioning means engages a portion of said article surrounding said opening to substantially fix said positioning means and said anchoring means against rotation;

rotating said threaded member in a predetermined direction to move said anchoring means in the direction of said positioning means and the second major surface of said article; and allowing the second major surface of said article to exert a reaction force on said feet to flatten said feet and spread the free ends thereof outwardly from said initial spread foot configuration, thereby securely attaching the fastener to the article.

10. The method according to claim 9 further including the step of selectively detaching the fastener from the article by exerting a force on the fastener in a direction from the second major surface to the first major surface to bend the feet so that the respective free ends thereof are moved away from the major axis of the threaded member and folded back toward the central member to allow the anchoring means to be drawn back through the opening.

11. A fastener adapted for insertion within a hole extending through a wall, comprising:

a conical member tapering downward from a first end to a second end thereof and having an opening extending axially therethrough;

a sleeve member threaded on an inner surface thereof and disposed substantially within said opening;

an anchoring member attached to said sleeve member adjacent to the second end of said conical member and being fixed against rotation with respect to said sleeve member, said anchoring member having a housing which is threaded on an inner surface thereof and a plurality of resilient curved feet flared outwardly from said housing for engaging an inner surface of said wall to anchor said fastener to said wall, said anchoring member being integrally formed on a first end of said sleeve member so that the respective openings in the housing of said anchoring member and in the sleeve member are substantially in alignment;

means for fixing said sleeve member and said anchoring member against rotation with respect to said conical member, said fixing means being comprised of first and second oppositely positioned tab members extending into the opening in said conical member adjacent to the second end of said conical member and first and second oppositely positioned grooves extending along an outer surface of said sleeve member for mating with the respective first and second tab members to fix said sleeve member and said anchoring member against rotation with respect to said conical member;

said sleeve member having a substantially cylindrical shape and further including an annular retaining member disposed adjacent to a second end of said sleeve member, opposite from the first end of said sleeve member, said retaining member for engaging said first and second tab members within the opening in said conical member to limit the axial movement of said sleeve member with respect to said conical member and prevent said sleeve member from being dislodged from said conical member; and a threaded member extending through respective aligned openings in said sleeve member and said housing of said anchoring member for engaging complementary threads within said respective openings, said threaded member being rotatable with respect to said conical member, said sleeve member and said anchoring member for attaching said fastener securely to said wall.

12. The fastener according to claim 11 wherein a portion of said sleeve member between said retaining member and said second end is tapered so that the diameter of said sleeve member at said second end is slightly less than the diameter of said sleeve member at said first end, said sleeve member being sufficiently resilient to allow said retaining member to be compressed to enable said retaining member to clear said first and second tab members when said sleeve member is inserted into said conical member, said second end of said sleeve member for being inserted into the opening at the second end of said conical member.

13. The fastener according to claim 12 wherein said sleeve member further includes first and second oppositely positioned slits extending axially through said second end and said retaining member to enhance the compressibility of said retaining member and said portion of said sleeve member between said second end of said sleeve member and said retaining member.

14. A fastener attachable to an article having first and second opposite major surfaces and a fastener receiving opening therebetween, comprising:

anchoring means for being inserted through said opening in a direction from said first major surface to said second major surface, said anchoring means having a cylindrical central member and a plurality of elongated feet extending both radially and axially outward from said central member at predetermined intervals around substantially the entire circumference of said central member to define a substantially spread foot configuration, said feet being bendable so that respective distal ends of said feet can be moved toward one another to allow said anchoring means to be inserted through said opening;

positioning means coupled to said anchoring means for engaging said article to substantially fix said anchoring means against rotation, said positioning means being comprised of a conical member tapering downward from a first end to a second end thereof and having a central bore extending axially therethrough, said conical member being adapted for insertion within a substantially circular opening in said article, the first end of said conical member having a slightly greater diameter than the diameter of said circular opening and the second end of said conical member having a slightly smaller diameter than the diameter of said circular opening so that at least a portion of said conical member is insertable within said opening and the outer surface of the conical member engages a portion of the article within the opening to provide a relatively tight friction fit between the conical member and the article, said positioning means further including a sleeve member threaded on an inner surface thereof and disposed substantially within the bore of said conical member, said sleeve member being coupled between said conical member and said anchoring means;

means for fixing said sleeve member against rotation with respect to said conical member, said fixing means comprising first and second oppositely positioned tab members extending radially into the bore of said conical member adjacent to the second end of said conical member and first and second oppositely positioned grooves extending along an outer surface of said sleeve member for mating with the respective first and second tab members to fix said sleeve member and said anchoring means against rotation with respect to said conical member; and securing means for engaging said anchoring means to move said anchoring means in a direction toward said second major surface after said anchoring means has been inserted through said opening to effect an engagement between said feet and said second major surface, the continued movement of said anchoring means toward said second major surface after said feet engage said second major surface for exerting increasing compressive force on said anchoring means to flatten and spread said feet outwardly in response to said increasing compressive force.

15. The fastener according to claim 14 wherein said anchoring means is attached to a first end of said sleeve member and said sleeve member includes an annular retaining member disposed adjacent to a second end of said sleeve member, opposite from said first end of the sleeve member, said retaining member for engaging said first and second tab members within the opening of said conical member to limit the axial movement of said sleeve member with respect to said conical member and prevent said sleeve member from being dislodged from said conical member.

16. The fastener according to claim 15 wherein a portion of said sleeve member between said retaining member and said second end is tapered so that the diameter of said sleeve member at said second end is slightly less than the diameter of said sleeve member at said first end, said sleeve member being sufficiently resilient to allow said retaining member to be compressed to enable said retaining member to clear said first and second tab members when said sleeve member is inserted into said conical member, said second end of said sleeve member for being inserted into the opening at the second end of said conical member.

17. The fastener according to claim 16 wherein said sleeve member further includes first and second oppositely positioned slits extending axially through said second end and said retaining member to enhance the compressibility of said retaining member and said portion of said sleeve member between said second end of said sleeve member and said retaining member.

18. The fastener according to claim 1 further including means for connecting said anchoring means to said positioning means so that said anchoring means is fixed against rotation with respect to said positioning means, said connecting means being comprised of first and second connectors attached at respective first ends thereof to said anchoring means and at respective second ends thereof to said positioning means.

19. The fastener according to claim 18 wherein said first and second connectors are collapsible at all points along the respective lengths thereof and are foldable inwardly along a major axis of said fastener as said anchoring means is moved in the direction of said second major surface of the article by said securing means so that said connectors can be at least partially withdrawn into the opening of said article when said anchoring means is moved toward the second major surface of said article.

20. The fastener according to claim 1 wherein said positioning means includes an alignment member having a first bore extending therethrough and the central member of said anchoring means has a second bore extending therethrough and substantially in alignment with said first bore, said central member being threaded on an inner surface thereof surrounding said second bore, said securing means being comprised of an elongated threaded member for extending through the aligned first and second bores for engaging complementary threads within said central member, said threaded member being rotatable in a predetermined direction with respect to said alignment member and said central member for moving said anchoring means in the direction of the second major surface of said article to compress the feet of said anchoring means against the second major surface of the article so that said feet tend to flatten and engage the second major surface of the article at a greater distance outwardly from the article opening in response to an increased compressive force imparted to said feet by the continued rotation of said threaded member in said predetermined direction.

21. A fastener attachable to an article having first and second opposite major surfaces and a fastener receiving opening therebetween, comprising:

anchoring means for being inserted through said opening in a direction from said first major surface to said second major surface, said anchoring means having a central member with a first bore extending axially therethrough and a plurality of elongated feet with free ends, said feet being biased outwardly from said central member to define an initial spread foot configuration, said feet being bendable so that the free ends of said feet can be moved toward one another to allow said anchoring means to be inserted through said opening;

a positioning member tapering downward from a first end to a second end thereof and having a second bore extending axially therethrough, said positioning member being adapted for insertion within a substantially circular opening in said article, said positioning member having a plurality of elongated ribs disposed thereon for enhancing the friction fit between the positioning member and a portion of the article within the opening, a portion of each of said ribs adjacent to the second end of said positioning member being beveled to facilitate the insertion of the positioning member into said opening;

means for connecting said anchoring means to said positioning member to maintain said anchoring means in a predetermined position relative to said positioning member and to substantially fix said anchoring means against rotation with respect to said positioning member, said connecting means being comprised of first and second flexible connectors attached at respective first ends thereof to the central member of said anchoring means and at respective second ends thereof to said positioning member adjacent to the second end of said positioning member, said connectors being collapsible at all points along the respective lengths thereof and being foldable along a major axis of the fastener so that said connectors can be at least partially withdrawn into the opening of said article when said anchoring means is moved toward the second major surface; and an elongated threaded member for extending through aligned first and second bores, said first bore having threads which are complementary with respect to said threads on said threaded member, said threaded member for engaging said complementary threads in said first bore, said threaded member being rotatable in a first predetermined direction for moving said anchoring means towards said positioning member and in a second predetermined direction, opposite from said first predetermined direction, for moving said anchoring means away from said positioning member.

22. The fastener according to claim 21 wherein said feet are comprised of a plastic material.

23. The fastener according to claim 21 wherein each of said feet is comprised of relatively flat, oppositely positioned first and second surfaces, the respective first surfaces of said feet being in facing relationship with said positioning member, said feet being bendable away from the axis of the threaded member such that the movement of said anchoring means in the direction of said positioning member by the rotation of said threaded member in said first predetermined direction is limited only by contact between the central member of said anchoring means and said second major surface or between the central member of said anchoring means and said positioning member, whichever occurs first.

* * * * *